(12) United States Patent
Kosaka et al.

(10) Patent No.: US 11,316,992 B2
(45) Date of Patent: Apr. 26, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Fumi Kosaka, Kanagawa (JP); Tadao Michimura, Kanagawa (JP); Norio Yamamoto, Kanagawa (JP); Seiji Inoue, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 216 days.

(21) Appl. No.: 16/565,501

(22) Filed: Sep. 10, 2019

(65) Prior Publication Data

US 2020/0099809 A1 Mar. 26, 2020

(30) Foreign Application Priority Data

Sep. 21, 2018 (JP) .............................. JP2018-177381

(51) Int. Cl.
*H04N 1/00* (2006.01)

(52) U.S. Cl.
CPC ..... *H04N 1/00503* (2013.01); *H04N 1/00413* (2013.01); *H04N 1/00474* (2013.01); *H04N 2201/0094* (2013.01)

(58) Field of Classification Search
CPC ........... H04N 1/00503; H04N 1/00413; H04N 1/00474; H04N 2201/0094

USPC ......................................................... 358/1.13
See application file for complete search history.

(56) References Cited

U.S. PATENT DOCUMENTS

| | | | |
|---|---|---|---|
| 6,029,198 A | 2/2000 | Iizuka | |
| 2005/0141020 A1 | 6/2005 | Harano | |
| 2019/0004679 A1* | 1/2019 | Hirasawa | ........... H04N 1/00424 |
| 2019/0149677 A1* | 5/2019 | Sone | .................... H04N 1/0097 |
| | | | 358/1.13 |

FOREIGN PATENT DOCUMENTS

| | | |
|---|---|---|
| JP | H10312258 | 11/1998 |
| JP | 2005165723 | 6/2005 |
| JP | 2011186789 | 9/2011 |

* cited by examiner

*Primary Examiner* — Neil R McLean
(74) *Attorney, Agent, or Firm* — JCIPRNET

(57) ABSTRACT

An information processing apparatus includes an extractor, a creator, and a sender. The extractor compares items of capability information concerning plural devices and extracts a capability which is not sufficiently provided in a first device but is provided in a second device. The plural devices include the first and second devices. The creator creates a menu to be used in the first device. The first device is able to display the capability extracted by the extractor by using an icon in a mode different from an icon representing another capability and to display device information which indicates that the capability is available in the second device. The sender sends the menu to the first device.

9 Claims, 11 Drawing Sheets

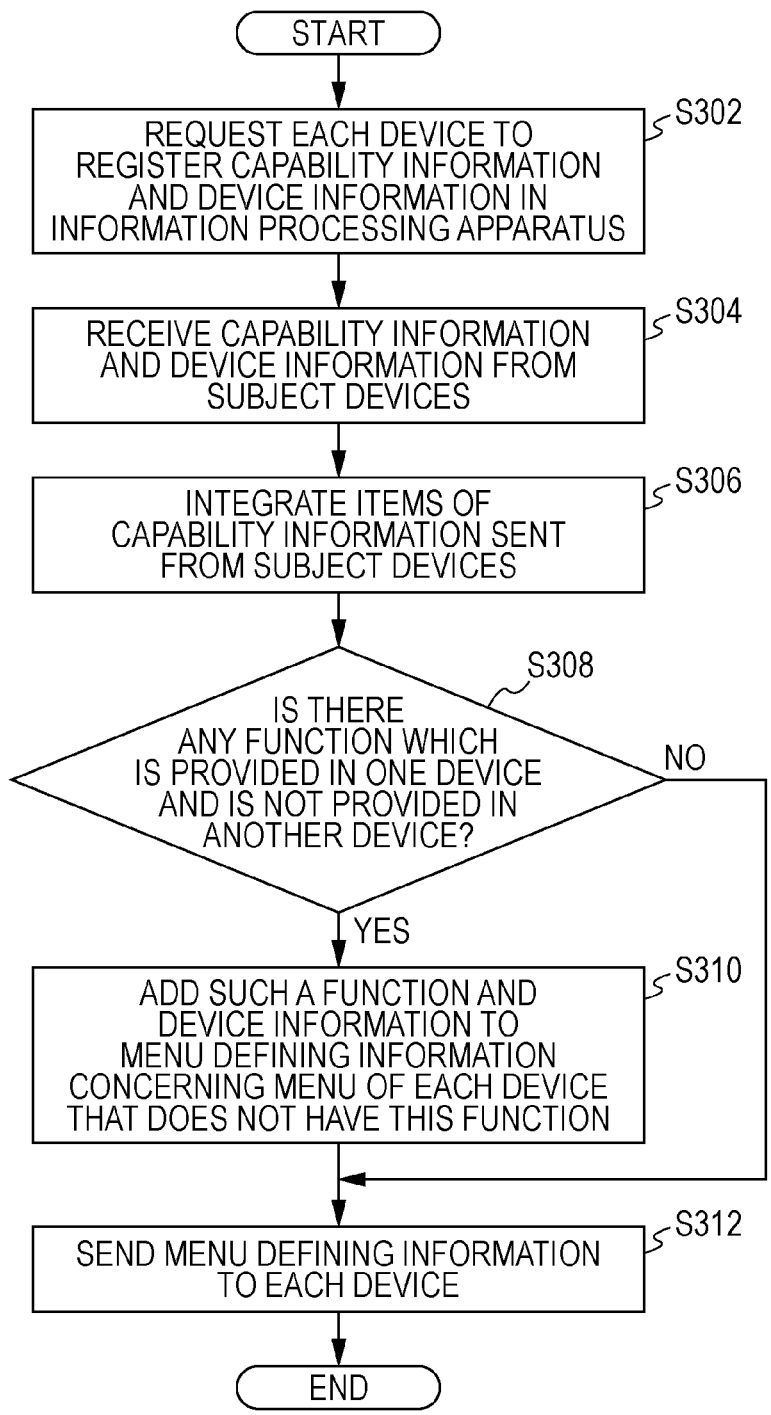

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-177381 filed Sep. 21, 2018.

BACKGROUND

(i) Technical Field

The present disclosure relates to an information processing apparatus and a non-transitory computer readable medium.

(ii) Related Art

Japanese Patent No. 5458970 discloses a document distribution system including an information processing apparatus and an image processing device which communicates with the information processing apparatus. The information processing apparatus includes a sender. The sender sends original screen defining data to the image processing device. The original screen defining data defines an operation screen for using a distribution procedure constituted by one or more operations for a digital document. The image processing device includes a receiver, a storage, a modification processor, and a display. The receiver receives the original screen defining data from the information processing apparatus. The storage stores capability information indicating the image reading capabilities of the image processing device. Among portions indicated by the received original screen defining data, some portions define the display content to be changed depending on the image reading capabilities. The modification processor modifies such portions in accordance with the stored capability information, so that a component of the screen related to an image reading item that the image processing device is unable to use will not be displayed. For using the distribution procedure, the display displays the operation screen corresponding to the screen defining data modified by the modification processor on an operation panel.

Japanese Unexamined Patent Application Publication No. 10-312258 discloses a control method and apparatus for a network device in which three states can be displayed in an information box, such as a combo box or a list box, for setting functions in the network device so as to enhance the user interface efficiency. When a function corresponding to a control field displayed on an environment setting screen for a device is supported by this device and when there is no data corresponding to this control field, a default value is set in this control field. Then, the name of this control field is displayed to indicate that the control field is enabled, and the default value is displayed in gray so that various states in the control field can be displayed.

Japanese Unexamined Patent Application Publication No. 2005-165723 discloses an image forming system and a display control method that achieve both of the security and the following management convenience. Specific user interface (UI) data is displayed on a display only in response to a request from a specific operator required to operate this specific UI data, and is erased at a suitable timing so that it can be prevented from being exposed to regular users. Each image forming device sends a request to provide specific UI data to an external device, together with identification information for identifying a corresponding image forming device, and obtains the specific UI data unique to the image forming device from the external device. The image forming device then generates and displays an individual UI on a UI display, based on the obtained specific UI data.

SUMMARY

To facilitate the maintenance of a menu displayed in each device, a menu for plural devices is created and is sent to each device. In this case, the menu is created such that an icon corresponding to a function which is not provided in a device is not displayed or a user is unable to select the icon in this device.

There may be a case in which a certain function is not provided in one device but is provided in another device. However, a user of the device without this function does not know the presence of another device having this function. If the user knows that this function is available in a nearby device, the user can access this nearby device and use the function.

Aspects of non-limiting embodiments of the present disclosure relate to an information processing apparatus and a non-transitory computer readable medium which are able to inform a user that a capability which is not sufficiently provided in a device to be used by the user is provided in another device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an extractor, a creator, and a sender. The extractor compares items of capability information concerning plural devices and extracts a capability which is not sufficiently provided in a first device but is provided in a second device. The plural devices include the first and second devices. The creator creates a menu to be used in the first device. The first device is able to display the capability extracted by the extractor by using an icon in a mode different from an icon representing another capability and to display device information which indicates that the capability is available in the second device. The sender sends the menu to the first device.

BRIEF DESCRIPTION OF THE DRAWINGS

An exemplary embodiment of the present disclosure will be described in detail based on the following figures, wherein:

FIG. 3 is a flowchart illustrating an example of processing executed by this exemplary embodiment;

DETAILED DESCRIPTION

An exemplary embodiment of the disclosure will be described below with reference to the accompanying drawings.

Figure 1:
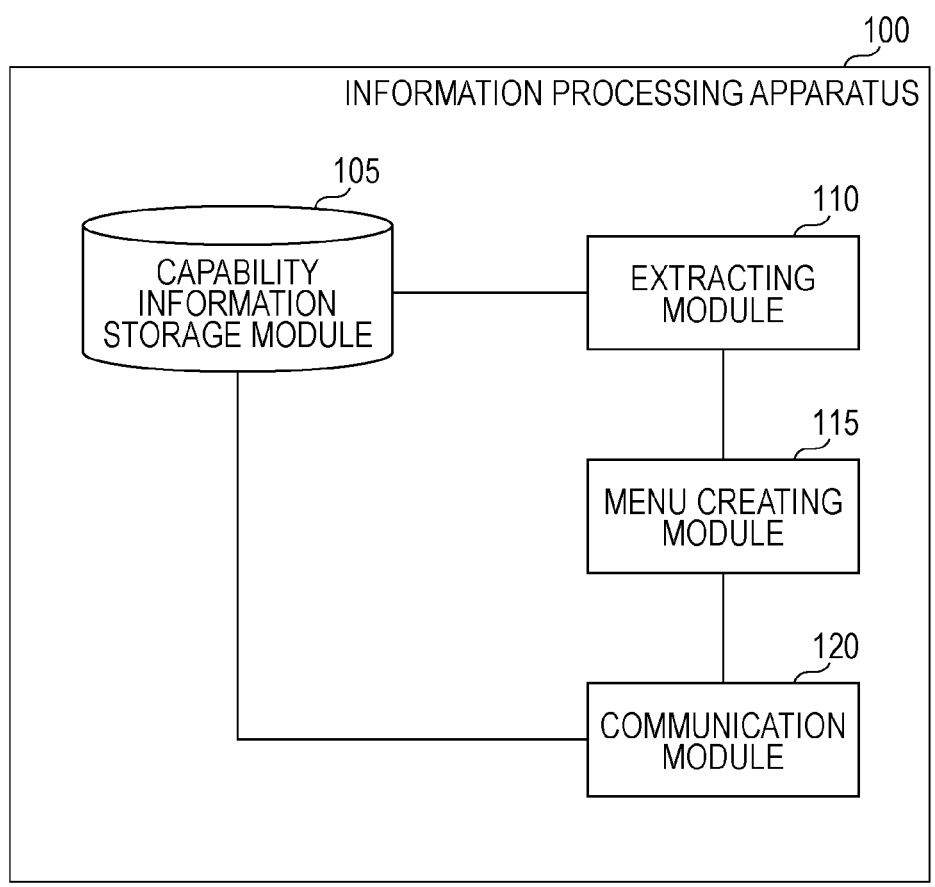
FIG. 1 is a block diagram illustrating conceptual modules forming an example of the configuration of the exemplary embodiment.

FIG. 1 is a block diagram illustrating conceptual modules forming an example of the configuration of the exemplary embodiment.

Generally, modules are software (computer programs) components or hardware components that can be logically separated from one another. The modules of the exemplary embodiment of the disclosure are, not only modules of a computer program, but also modules of a hardware configuration. Thus, the exemplary embodiment will also be described in the form of a computer program for allowing a computer to function as those modules (a program for causing a computer to execute program steps, a program for allowing a computer to function as corresponding units, or a computer program for allowing a computer to implement corresponding functions), a system, and a method. While expressions such as "store", "storing", "being stored", and equivalents thereof are used for the sake of description, such expressions indicate, when the exemplary embodiment relates to a computer program, storing the computer program in a storage device or performing control so that the computer program will be stored in a storage device. Modules may correspond to functions based on a one-to-one relationship. In terms of implementation, however, one module may be constituted by one program, or plural modules may be constituted by one program. Conversely, one module may be constituted by plural programs. Additionally, plural modules may be executed by using a single computer, or one module may be executed by using plural computers in a distributed or parallel environment. One module may integrate another module therein. Hereinafter, the term "connection" includes not only physical connection, but also logical connection (sending and receiving of data, giving instructions, reference relationships among data elements, login, etc.). The term "predetermined" means being determined prior to a certain operation, and includes the meaning of being determined prior to a certain operation before starting processing of the exemplary embodiment, and also includes the meaning of being determined prior to a certain operation even after starting processing of the exemplary embodiment, in accordance with the current situation/state or in accordance with the previous situation/state. If there are plural "predetermined values", they may be different values, or two or more of the values (or all the values) may be the same. A description having the meaning "in the case of A, B is performed" is used as the meaning "it is determined whether the case A is satisfied, and B is performed if it is determined that the case A is satisfied", unless such a determination is unnecessary. If elements are enumerated, such as "A, B, and C", they are only examples unless otherwise stated, and such enumeration includes the meaning that only one of them (only the element A, for example) is selected.

A system or an apparatus may be implemented by connecting plural computers, hardware units, devices, etc., to one another via a communication medium, such as a network (including communication connection based on a one-to-one correspondence), or may be implemented by a single computer, hardware unit, device, etc. The terms "apparatus" and "system" are used synonymously. The term "system" does not include merely a man-made social "mechanism" (social system).

Additionally, every time an operation is performed by using a corresponding module or every time each of plural operations is performed by using a corresponding module, target information is read from a storage device, and after performing the operation, a processing result is written into the storage device. A description of reading from the storage device before an operation or writing into the storage device after an operation may be omitted. Examples of the storage device may be a hard disk drive, a random access memory (RAM), an external storage medium, a storage device using a communication line, and a register within a central processing unit (CPU).

An information processing apparatus 100 according to this exemplary embodiment has a function of creating a menu to be used in a device. As shown in the example in FIG. 1, the information processing apparatus 100 includes a capability information storage module 105, an extracting module 110, a menu creating module 115, and a communication module 120.

The device may be any type of device that can communicate with the information processing apparatus 100. Examples of the device are an image processing device (such as a copying machine, a fax machine, a scanner, a printer, or a multifunction device (device including two or more functions among a scanner, a printer, a copying machine, and a fax machine)), a personal computer (PC), and a home information appliance. A description will be given below, assuming that an image processing device is used as the device.

The capability information storage module 105 is connected to the extracting module 110 and the communication module 120. The capability information storage module 105 stores device capability information and device information. The capability information storage module 105 stores a capability information table 400 and a device information table 500, for example.

Figure 4:
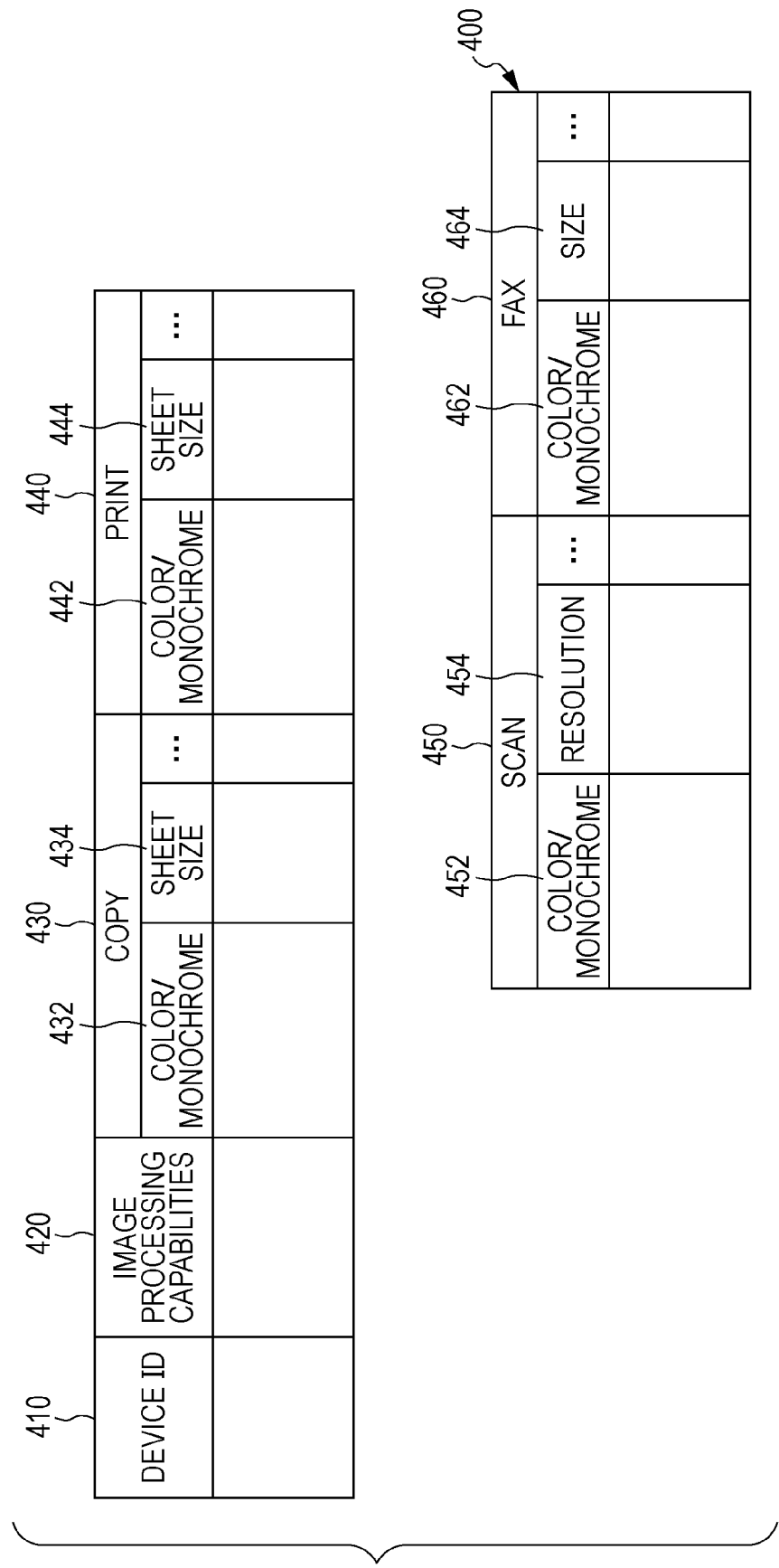
FIG. 4 illustrates an example of the data structure of a capability information table.

FIG. 4 illustrates an example of the data structure of the capability information table 400. The capability information table 400 has a device ID field 410, an image processing capability field 420, a copy field 430, a print field 440, a scan field 450, and a fax field 460. The copy field 430 has a color/monochrome field 432 and a sheet size field 434. The print field 440 has a color/monochrome field 442 and a sheet size field 444. The scan field 450 has a color/monochrome field 452 and a resolution field 454. The fax field 460 has a color/monochrome field 462 and a size field 464.

The device ID field 410 stores information for uniquely identifying a corresponding device (device identification (ID)) in this exemplary embodiment. The image processing capability field 420 indicates the image processing capabilities of this device. For example, among the copy, print, scan, and fax functions, the functions provided in the device are indicated. The copy field 430 stores information concerning copy functions of the device. The color/monochrome field 432 stores information whether the device is able to perform color copy or only monochrome copy. The sheet size field 434 indicates sheet sizes (usually plural sheet sizes) that can be used by the device for copying. The print field 440 stores information concerning print functions of the device. The color/monochrome field 442 stores information whether the device is able to perform color print or only monochrome print. The sheet size field 444 indicates sheet sizes (usually plural sheet sizes) that can be used by the device for printing. The scan field 450 stores information concerning scan functions of the device. The color/monochrome field 452 stores information whether the device is able to read images in color or only in monochrome for scanning. The resolution field 454 indicates the scan resolution of the device. The fax field 460 stores information concerning fax functions of the device. The color/monochrome field 462 stores information whether the device is able to perform fax communication in color or only in monochrome. The size field 464 indicates a size that can be handled by the device for fax communication.

Figure 5:
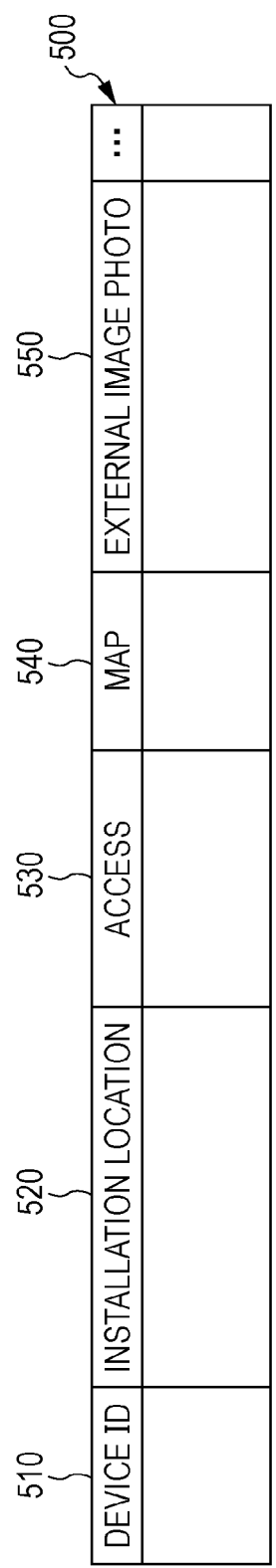
FIG. 5 illustrates an example of the data structure of a device information table.

FIG. 5 illustrates an example of the data structure of the device information table 500. The device information table 500 has a device ID field 510, an installation location field 520, an access field 530, a map field 540, and an external image photo field 550. The device ID field 510 stores the ID of a corresponding device. The installation location field 520 indicates the installation location of the device. The access field 530 stores information concerning how to access the installation location. The map field 540 stores the map of the installation location. The external image photo field 550 stores a photo of the external image of the device.

Referring back to FIG. 1, the extracting module 110 is connected to the capability information storage module 105 and the menu creating module 115. The extracting module 110 compares individual items of capability information concerning plural devices, and extracts a capability that is not sufficiently provided in one device (first device, which is a subject device) but is provided in another device (second device). As the items of capability information to be compared with each other, capability information stored in the capability information storage module 105 may be used, or items of capability information obtained by the communication module 120 from individual devices may be used.

"Capabilities" include functions and processing performance, for example. For example, if a device is a multifunction device, an example of the functions of this multifunction device is a fax function, and an example of the processing performance of this multifunction device is the scan resolution as a scanner.

When a capability is not sufficiently provided in a device, it may mean either one of the two cases: (1) the device does not have a function corresponding to this capability though another device has this function; and (2) the device has this function but the processing performance of this function is not as good as that in another device. In the above-described example, the case (1) is that the multifunction device does not have a fax function, while another device has this function. The case (2) is that the multifunction device has a fax function but it can read only with a low resolution (1200 dots per inch (dpi), for example) by using a scan function, while another device can read with a high resolution (2400 dpi, for example) by using a scan function.

The menu creating module 115 is connected to the extracting module 110 and the communication module 120. The menu creating module 115 creates a menu to be used in the first device. The first device is able to display a capability extracted by the extracting module 110 by using an icon in a mode different from an icon representing another capability and to display device information indicating that the capability is available in the second device. As the device information, the device information stored in the capability information storage module 105 may be used, or device information obtained by the communication module 120 from the second device may be used.

The above-described "icon representing another capability" is an icon representing a capability available in the first device. This icon is selectable, and when this icon is selected, the capability corresponding to this icon becomes available for use (operation corresponding this capability is not necessarily executed immediately).

As the second device, the menu creating module 115 may select a device that is available for an operator to use the first device.

If plural second devices are available for the operator of the first device, the menu creating module 115 may create the menu so that the plural second devices can be displayed in ascending order of the distance to the first device or in descending order of the capability of the second devices.

The device information may include information concerning the location of the second device. Examples of the information concerning the location of the second device are a photo of the second device, the location where the second device is installed, and a map of this location. Displaying of this information enables the operator of the first device to know how to get to the second device.

As the second device, the menu creating module 115 may select a device that is available in an organization in which the first device is installed and a device that is installed in the building in which the first device is installed and that is available for anyone.

An example of the device that is installed in the building in which the first device is installed and that is available for anyone is a device installed in a store (such as a convenience store) within the building in which the first device is installed.

The communication module 120 is connected to the capability information storage module 105 and the menu creating module 115. The communication module 120 sends a menu created by the menu creating module 115 to the first device.

Instead of using the capability information storage module 105, the communication module 120 may obtain capability information and device information concerning a device directly from this device. More specifically, the communication module 120 is connected to a device via a communication line and may receive capability information and device information directly from this device.

The communication module 120 may obtain information (capability information and device information) concerning a device immediately before the menu creating module 115 creates a menu or may receive information (capability information and device information) voluntarily sent from a device.

If the communication module 120 has obtained capability information and device information by receiving them voluntarily sent from the device, the menu creating module 115 may create a menu immediately after.

Figure 2A:
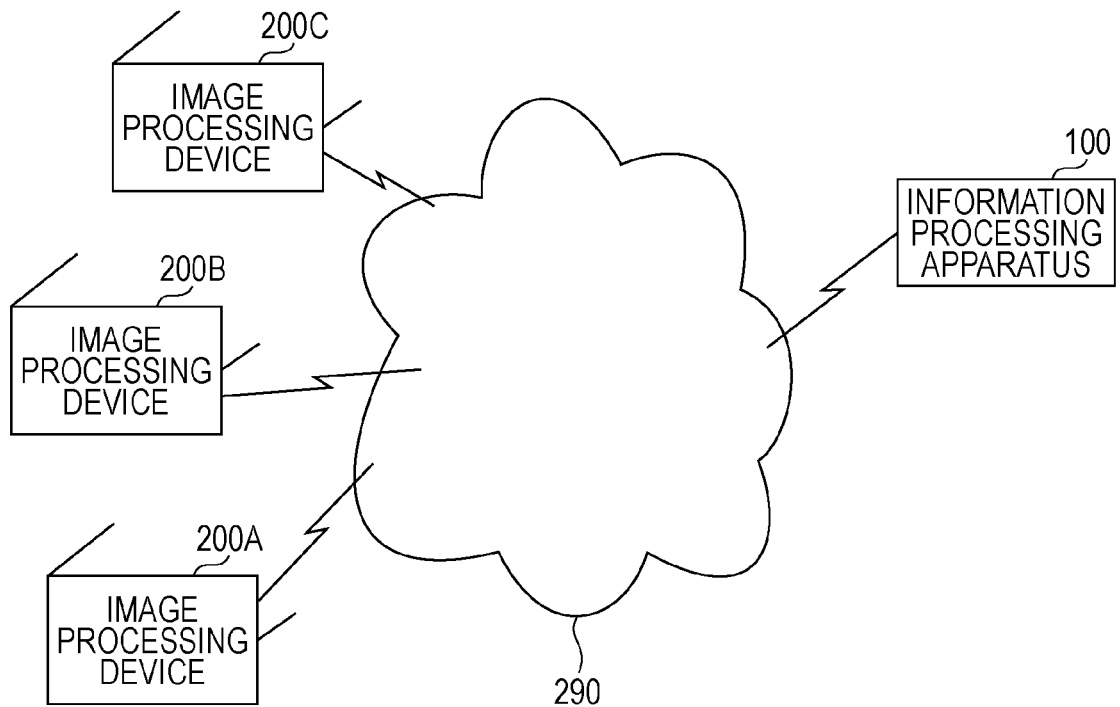
FIGS. 2A and 2B illustrate examples of the system configuration utilizing this exemplary embodiment.
Figure 2B:
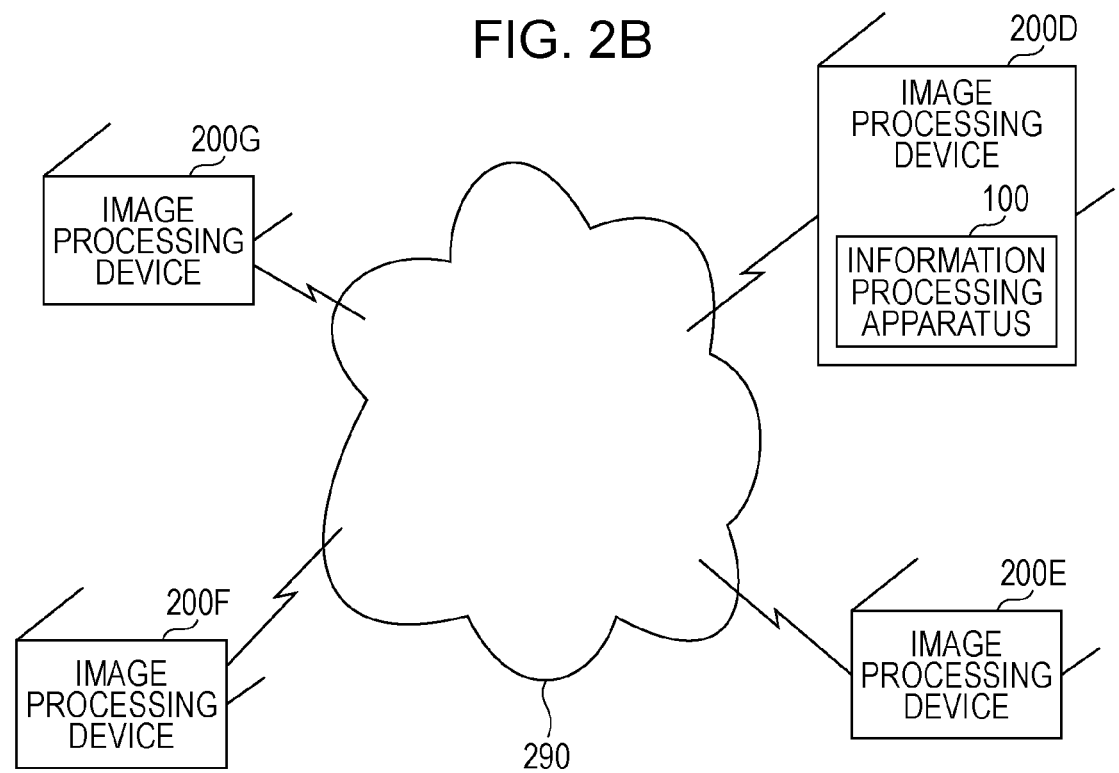

FIGS. 2A and 2B illustrate examples of the system configuration utilizing this exemplary embodiment.

FIG. 2A illustrates an example of the system configuration when the information processing apparatus 100 is implemented as a server. The information processing apparatus 100 in this system configuration serves as a common-menu management server.

The information processing apparatus 100 is connected to image processing devices 200A, 200B, and 200C via a communication line 290. The communication line 290 may be a wireless or wired medium, or a combination thereof, and may be, for example, the Internet or an intranet as a communication infrastructure. The functions of the information processing apparatus 100 may be implemented as cloud services.

FIG. 2B illustrates an example of the system configuration when the information processing apparatus 100 is constructed within an image processing device 200.

In this example, an image processing device 200D includes the information processing apparatus 100. The image processing device 200D and image processing devices 200E, 200F, and 200G are connected to one another via a communication line 290. The image processing device 200D manages a menu of the image processing device 200D and menus of the other image processing devices (image processing devices 200E, 200F, and 200G). That is, the image processing device 200D, which manages the other plural image processing devices, is able to determine user interface information and send it to the other image processing devices. In this case, the information processing apparatus 100 may obtain the capability information table 400 and the device information table 500 from the image processing device 200D or may access the capability information table 400 and the device information table 500 stored in the image processing device 200D.

In the examples in FIGS. 2A and 2B, the information processing apparatus 100 manages three image processing devices 200. However, this is only an example, and the information processing apparatus 100 may manage any plural devices. The information processing apparatus 100 can communicate with each image processing device 200 via the communication line 290. Each image processing device 200 stores its own capability information and device information, and the information processing apparatus 100 is able to obtain the capability information and the device information concerning an individual image processing device 200.

The information processing apparatus 100 forms screen defining data concerning a common menu for each image processing device 200 and sends the screen defining data to each image processing device 200. Each image processing device 200 displays the common menu sent from the information processing apparatus 100 on a display (also called a panel or an operation screen).

The information processing apparatus 100 causes plural devices (image processing devices 200 in the example of FIGS. 2A and 2B) to display a common menu. However, the capabilities of the individual devices are usually different. The plural devices thus display menus in accordance with the capabilities of their own devices, though they use the same user interface for the menus.

It is now assumed that a device A (an example of the related art) is not managed in this exemplary embodiment and is unable to perform a function X (fax function, for example). In this case, when plural devices share a common menu, the common menu is modified in accordance with the capabilities of the individual devices so that a function which is not provided in a device is not included in the menu displayed on this device, for example, the function X is not included in the menu displayed on the device A. That is, on the screen of each device, functions provided in a corresponding device are displayed, and functions which are not provided in this device are not displayed.

It is now assumed that a device B located near the device A has the function X. However, the function X is not included in the menu displayed on the screen of the device A. In this case, the user of the device A is likely to presume that the device B does not have the function X, especially when the external appearance of the device B is similar to that of the device A.

In this exemplary embodiment, instead of excluding the function X from the menu displayed on the screen of the device A, an icon representing that the function X is available in the device B is displayed for a user of the device A. When the user clicks this icon, information required for using the function X of the device B is displayed.

Alternatively, an icon of the function X which has made disabled may be displayed on the screen of the device A, and near this icon, a "for using this function" button may be displayed. When this button is clicked, information required for using the function X of the device B may be displayed.

Instead of storing device information in an individual device, the information processing apparatus 100 may register and manage the device information concerning an individual device.

FIG. 3 is a flowchart illustrating an example of processing executed by this exemplary embodiment (information processing apparatus 100).

In step S302, the communication module 120 requests each device to register capability information and device information concerning its own device in the information processing apparatus 100.

In step S304, the communication module 120 receives capability information and device information from subject devices. The capability information may be the capability information table 400, and the device information may be the device information table 500.

In step S306, the menu creating module 115 integrates the plural items of capability information sent from the subject devices.

In step S308, the menu creating module 115 judges whether there is a function which is provided in a certain device and is not provided in another device. If such a function is found, the process proceeds to step S310. If such a function is not found, the process proceeds to step S312.

In step S310, the menu creating module 115 adds such a function and device information to menu defining information concerning a menu of each device which does not have this function.

In step S312, the communication module 120 sends the menu defining information to each device.

Steps S302 through S310 (such as generating menu defining information) may be executed in advance. Then (after the lapse of a considerable time, for example), step S312 (sending menu defining information to each device) may be executed. Steps S302 through S310 may alternatively be executed immediately before step S312.

Figure 6:
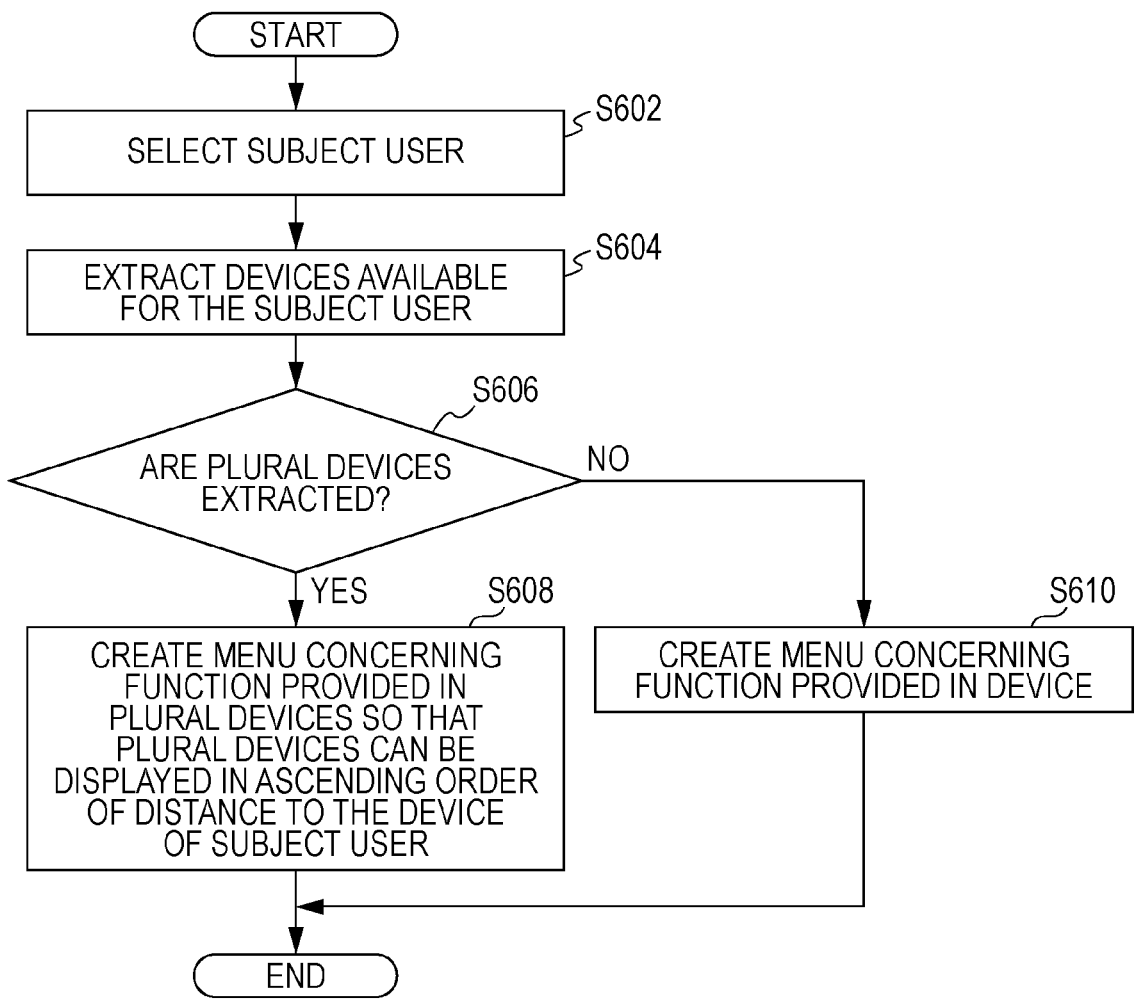
FIG. 6 is a flowchart illustrating an example of processing executed by this exemplary embodiment.

FIG. 6 is a flowchart illustrating an example of processing executed by this exemplary embodiment (information processing apparatus 100).

In step S602, a subject user is selected.

In step S604, devices that are available for this user are extracted. A table representing the association between this user and devices available for this user has been prepared. By using this table, devices available for this user can be extracted.

In step S606, it is judged whether plural devices are extracted in step S604. If plural devices are extracted, the process proceeds to step S608. If only one device is extracted, the process proceeds to step S610.

In step S608, a menu concerning a function provided in the plural devices is created so that the plural devices can be displayed in ascending order of the distance to the device of the subject user.

In step S610, a menu concerning a function provided in the device is created.

Figure 7:
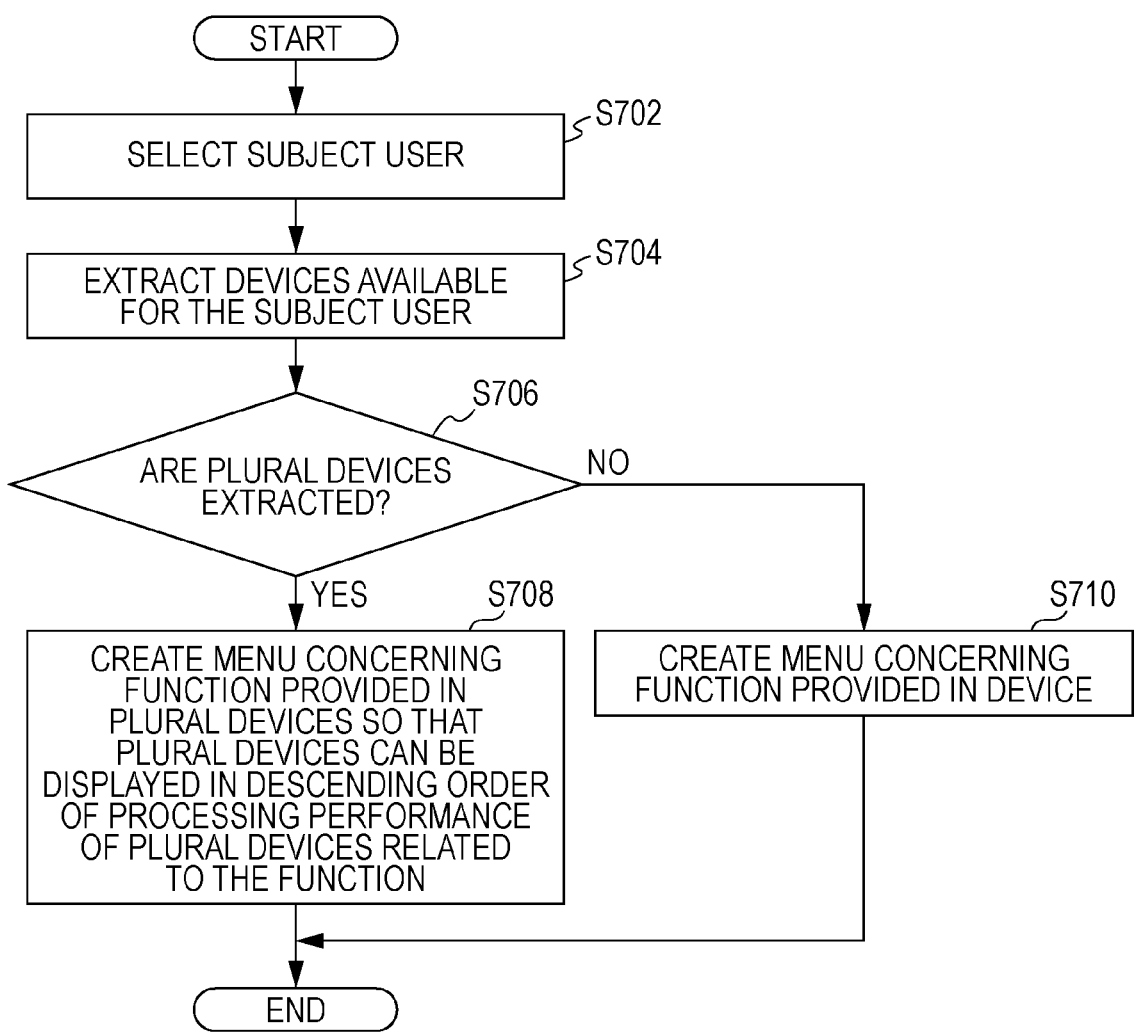
FIG. 7 is a flowchart illustrating an example of processing executed by this exemplary embodiment.

FIG. 7 is a flowchart illustrating an example of processing executed by this exemplary embodiment.

In step S702, a subject user is selected.

In step S704, devices that are available for this user are extracted.

In step S706, it is judged whether plural devices are extracted in step S704. If plural devices are extracted, the process proceeds to step S708. If only one device is extracted, the process proceeds to step S710.

In step S708, a menu concerning a function provided in the plural devices is created in descending order of the processing performance of the plural devices related to this function. Examples of the processing performance are the processing speed (copy speed, print speed, or scan speed) and the resolution.

In step S710, a menu concerning a function provided in the device is created.

In the processing of the example shown in FIG. 6 or 7, a menu may be created for each user in advance. Alternatively, after a user logs in its device, a menu may be created. In the case of the second case, if a user is required to perform login operation to use the image processing device 200 and if the information processing apparatus 100 executes login processing via the image processing device 200, it can identify the user. If the image processing device 200 executes login processing, it notifies the information processing apparatus 100 of the user logged in the image processing device 200, thereby enabling the information processing apparatus 100 to create a menu suitable for this user.

The exemplary embodiment will be described through illustration of a specific example.

The image processing device 200A has a copy function, a scan function, a print function, and a fax function. The image processing device 200B has a copy function, a scan function, and a print function. That is, the image processing device 200B does not have a fax function.

The image processing devices 200A and 200B each store, not only capability information (function and processing performance information, such as the capability information table 400), but also device information (such as the device information table 500) for other image processing devices 200 that do not have a capability provided in the image processing device 200A or 200B.

The information processing apparatus 100 manages the image processing devices 200A and 200B.

The information processing apparatus 100 requests the image processing devices 200A and 200B to register the capability information and the device information in the information processing apparatus 100.

The image processing devices 200A and 200B each send the capability information and the device information to the information processing apparatus 100.

The information processing apparatus 100 compares the capability information and the device information received from the image processing device 200A and those from the image processing device 200B. As a result of comparison, the information processing apparatus 100 identifies that the image processing device 200B does not have a fax function.

The information processing apparatus 100 generates common-menu defining information for the image processing devices 200A and 200B.

When generating this common-menu defining information, the information processing apparatus 100 creates a fax menu for the image processing device 200B and adds the device information concerning the image processing device 200A to this fax menu.

The information processing apparatus 100 sends the common-menu defining information to the image processing devices 200A and 200B.

Figure 8:
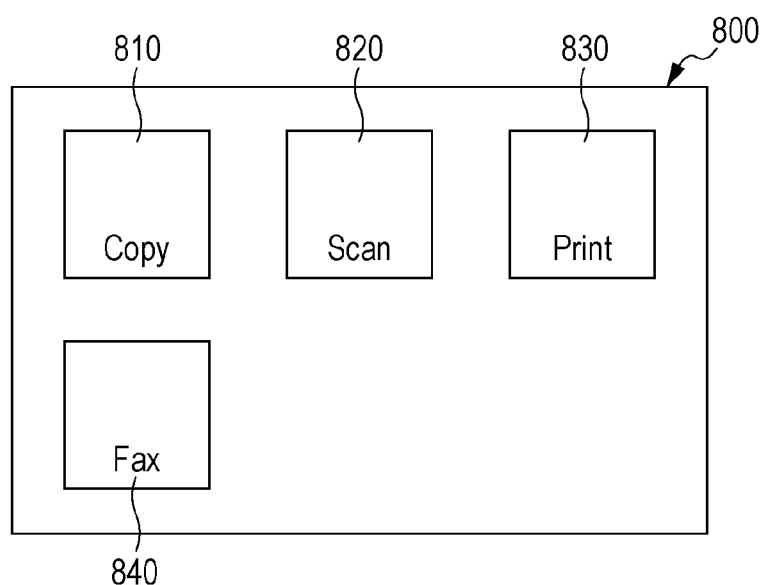
FIG. 8 illustrates an example of processing executed by this exemplary embodiment.

The image processing device 200A displays a menu based on the common-menu defining information received from the information processing apparatus 100. The image processing device 200A displays a screen 800, such as that shown in FIG. 8, for example. FIG. 8 illustrates an example of processing executed by this exemplary embodiment. On the screen 800 of the image processing device 200A, a copy button 810, a scan button 820, a print button 830, and a fax button 840 are displayed.

Figure 9:
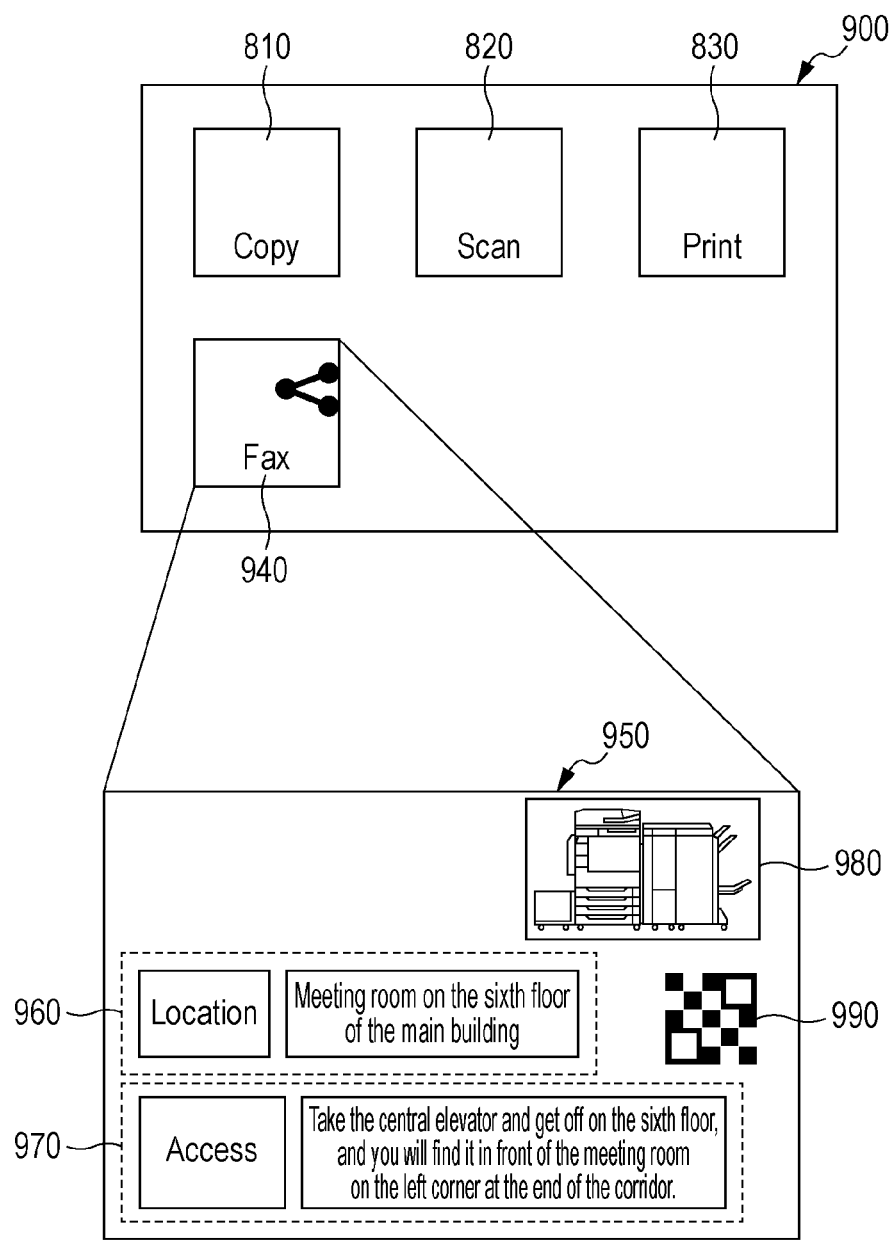
FIG. 9 illustrates an example of processing executed by this exemplary embodiment.

The image processing device 200B displays a menu based on the common-menu defining information received from the information processing apparatus 100. The image processing device 200B displays a screen 900, such as that shown in FIG. 9, for example. FIG. 9 illustrates an example of processing executed by this exemplary embodiment. On the screen 900 of the image processing device 200B, the copy button 810, the scan button 820, the print button 830, and a fax button 940 are displayed.

When displaying the fax menu (icon as the fax button 940), the image processing device 200B displays it in a different mode from the menus of the other functions (icons as the copy button 810, the scan button 820, and the print button 830 provided in the image processing device 200B or a regular fax icon (fax button 840). The fax menu may be displayed in a different mode by adding characters, a drawing, or a symbol, changing the configuration, design, or color, making dynamic change (using flash and animated graphics, for example), blinking, and a combination thereof. If the fax menu is displayed in a different mode by using blinking, the difference between the fax menu and the other menus may be represented by whether blinking is performed or by the blinking period or the interval of blinking. Unlike the copy button 810, the scan button 820, and the print button 830, or the fax button 840, the fax button 940 is appended with graphics showing that another image processing device 200 has a fax function.

When the fax button 940 is selected, a screen 950 shown in the lower section of FIG. 9 is displayed on the display of the image processing device 200B. On the screen 950, a location field 960, an access field 970, an external image photo 980, and code information 990 are displayed.

Figure 11:
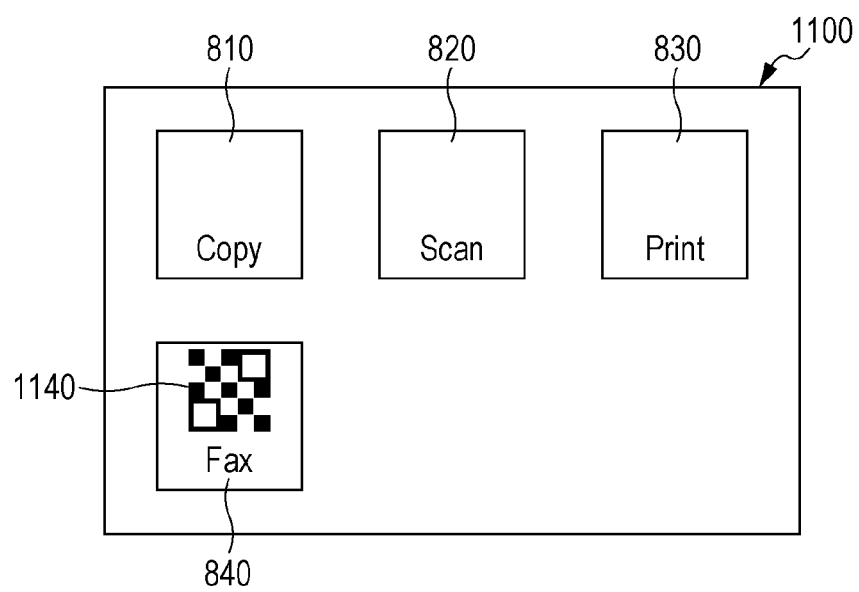
FIG. 11 illustrates an example of processing executed by this exemplary embodiment.

The location field 960 shows the location where the image processing device 200A is installed (the meeting room on the sixth floor of the main building). The access field 970 indicates how to get to the image processing device 200A ("Take the central elevator and get off on the sixth floor, and you will find it in front of the meeting room on the left corner at the end of the corridor"). The external image photo 980 shows the external appearance of the image processing device 200A. The code information 990 indicates information concerning the image processing device 200A. The code information 990 is image code systematically generated for representing machine-readable digital data. Specific examples of the code information 990 are linear barcode and two-dimensional barcode. Quick response (QR) code (registered trademark), in particular, is being widely used as the two-dimensional barcode. In this exemplary embodiment, QR code is used as the code information 990, as shown in FIGS. 9 and 11. In the code information 990, information concerning the image processing device 200A (in addition to information concerning the location field 960, access field 970, and external image photo 980, the name and processing performance of the image processing device 200A) may be embedded. When a user images the code information 990 with a camera smartphone, the code information 990 is analyzed and information concerning the image processing device 200A is displayed. Uniform resource locator (URL) concerning the image processing device 200A may also be embedded in the code information 990. When a user images the code information 990 with a camera smartphone, the code information 990 is analyzed, and the URL page describing information concerning the image processing device 200A is displayed. Additionally, by the use of the smartphone functions (such as the global positioning system (GPS) function and map function), the route from the current position of a user (position at which the image processing device 200B is installed) to the image processing device 200A may be displayed on a map.

Figure 10:
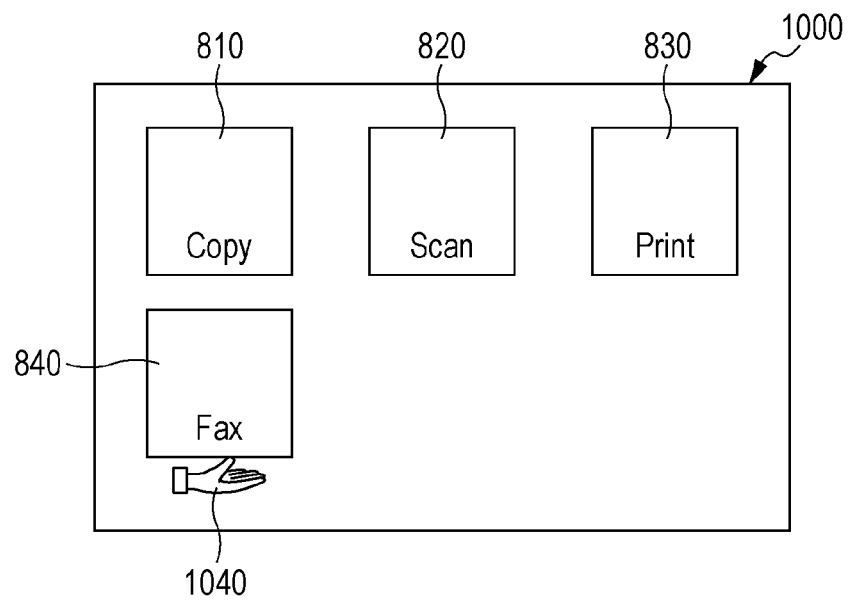
FIG. 10 illustrates an example of processing executed by this exemplary embodiment.

A screen 1000, such as that shown in FIG. 10, may be displayed on the display of the image processing device 200B. FIG. 10 illustrates an example of processing executed by this exemplary embodiment. On the screen 1000, the copy button 810, the scan button 820, the print button 830, and the fax button 840 are displayed. The fax button 840 is appended with a sharing icon 1040. The sharing icon 1040 is an image showing that the image processing device 200B can share a fax function with another device (that another image processing device 200 has a fax function). In this example, the sharing icon 1040 is the image of a palm.

When the fax button 840 appended with the sharing icon 1040 is selected, the screen 950 shown in FIG. 9 is displayed.

A screen 1100, such as that shown in FIG. 11, may be displayed on the display of the image processing device 200B. FIG. 11 illustrates an example of processing executed by this exemplary embodiment. On the screen 1100, the copy button 810, the scan button 820, the print button 830, and the fax button 840 are displayed. Code information 1140 is superposed on the fax button 840. The code information 1140 is similar to the code information 990 shown in FIG. 9. As discussed above, a user images the code information 1140 with a camera smartphone, so that a page describing information concerning the image processing device 200A can be displayed.

An image processing device 200 installed outside, in a convenience store, for example, may be included as an example of an alternative device that a user can use. In this case, information indicating that a device available for the user is installed outside (such as in a convenience store) and offers a charged service may clearly be stated. Such an alternative device may be restricted to an image processing device 200 installed at an in-house location, such as in an in-house convenience store.

As a menu showing that a capability which is not sufficiently provided in a subject device is provided in another device, a function menu is used by way of example. However, in addition to or instead of a function menu, a performance menu related to this function may be displayed. For example, setting levels of a certain function may be provided as a performance menu. In this case, a performance menu, which is not available in the subject device, is displayed in a different mode from other menus which are available in the subject device. The performance menu may merely display information that a subject function can be executed in the subject device but the processing performance of this function in another device is higher than that of the subject device. An example of such a case is that the resolution of the subject device is 1200 dpi, while that of another device is 2400 dpi. The capability information obtained from a device having a higher performance level includes processing performance information in addition to function information. Specific examples of the processing performance information are the above-described resolution and print speed (such as 30 ppm and 50 ppm).

If plural image processing devices 200 including the image processing device 200A have a fax function, when the fax button 940 shown in FIG. 9 is selected, a list of the image processing devices 200 including the image processing device 200A may be displayed. After a user selects one of the image processing devices 200, information concerning the selected image processing device 200 may be displayed. In this list, the image processing devices 200 may be displayed in the predetermined order indicated in the flowchart of FIG. 6 or 7.

Figure 12:
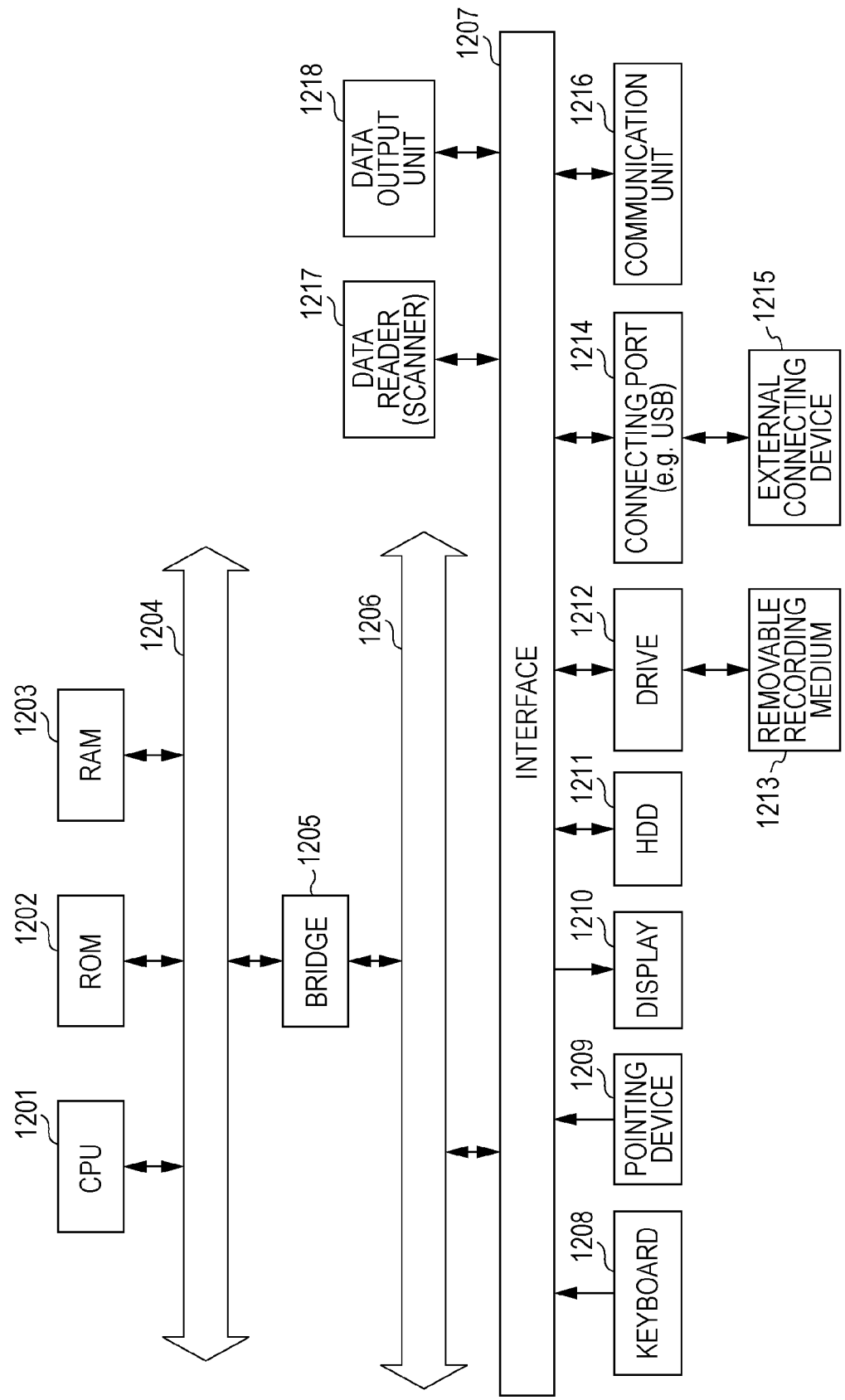
FIG. 12 is a block diagram illustrating an example of the hardware configuration of a computer implementing the exemplary embodiment.

An example of the hardware configuration of the information processing apparatus 100 and the image processing device 200 of this exemplary embodiment will be described below with reference to FIG. 12. The hardware configuration shown in FIG. 12 is implemented as a PC, for example, and includes a data reader 1217, such as a scanner, and a data output unit 1218, such as a printer.

A CPU 1201 is a control unit that executes processing in accordance with a computer program describing an execution sequence of the modules of the above-described exemplary embodiment, that is, the extracting module 110, the menu creating module 115, and the communication module 120.

A read only memory (ROM) 1202 stores programs and operation parameters used by the CPU 1201. A RAM 1203 stores programs used during the execution of the CPU 1201 and parameters which change appropriately during the execution of the programs. The CPU 1201, the ROM 1202, and the RAM 1203 are connected to one another via a host bus 1204, which is constituted by, for example, a CPU bus.

The host bus 1204 is connected to an external bus 1206, such as a peripheral component interconnect/interface (PCI) bus, via a bridge 1205.

A keyboard 1208 and a pointing device 1209, such as a mouse, are devices operated by an operator. A display 1210 is, for example, a liquid crystal display or a cathode ray tube (CRT), and displays various items of information as text or image information. Alternatively, a touchscreen having both of the functions of the pointing device 1209 and the display 1210 may be provided. In this case, to implement the function of the keyboard, a keyboard drawn on a screen (touchscreen) by using software, that is, a so-called software keyboard or screen keyboard, may be used instead of the keyboard 1208, which is a physical keyboard.

A hard disk drive (HDD) 1211 has a built-in hard disk (may alternatively be a flash memory, for example) and drives the hard disk so as to record or play back information or programs executed by the CPU 1201. The HDD 1211 implements the function of the capability information storage module 105, for example. Various other items of data and various other computer programs are also stored in the HDD 1211.

A drive 1212 reads data or a program recorded in a removable recording medium 1213, such as a magnetic disk, an optical disc, a magneto-optical disk, or a semiconductor memory, and supplies the read data or program to the RAM 1203 via an interface 1207, the external bus 1206, the bridge 1205, and the host bus 1204. The removable recording medium 1213 is also usable as a data recording region.

A connecting port 1214 is a port for connecting the PC to an external connecting device 1215, and has a connecting portion, such as a universal serial bus (USB) port or an IEEE1394 port. The connecting port 1214 is connected to, for example, the CPU 1201, via the interface 1207, the external bus 1206, the bridge 1205, and the host bus 1204. A communication unit 1216 is connected to a communication line and executes data communication processing with an external source. The data reader 1217 is, for example, a scanner, and executes processing for reading documents. The data output unit 1218 is, for example, a printer, and executes processing for outputting document data.

In the above-described exemplary embodiment, concerning elements implemented by a software computer program, such a computer program is read into a system having the hardware configuration shown in FIG. 12, and the above-described exemplary embodiment is implemented by a combination of software and hardware resources.

The hardware configuration of the information processing apparatus 100 and the image processing device 200 shown in FIG. 12 is only an example, and the exemplary embodiment may be configured in any manner in which the modules described in the exemplary embodiment are executable. For example, some modules may be configured as dedicated hardware (for example, an application specific integrated circuit (ASIC) or a field-programmable gate array (FPGA)), or some modules may be installed in an external system and be connected to the PC via a communication line. A system, such as that shown in FIG. 12, may be connected to a system, such as that shown in FIG. 12, via a communication line, and may be operated in cooperation with each other. Additionally, instead of into a PC, the modules may be integrated into a mobile information communication device (including a cellular phone, a smartphone, a mobile device, and a wearable computer), a home information appliance, a robot, a copying machine, a fax machine, a scanner, a printer, and a multifunction device.

The above-described program may be stored in a recording medium and be provided. The program recorded on a recording medium may be provided via a communication medium. In this case, the above-described program may be implemented as a "non-transitory computer readable medium storing the program therein" in the exemplary embodiment.

The "non-transitory computer readable medium storing a program therein" is a recording medium storing a program therein that can be read by a computer, and is used for installing, executing, and distributing the program.

Examples of the recording medium are digital versatile disks (DVDs), and more specifically, DVDs standardized by the DVD Forum, such as DVD-R, DVD-RW, and DVD-RAM, DVDs standardized by the DVD+RW Alliance, such as DVD+R and DVD+RW, compact discs (CDs), and more specifically, a CD read only memory (CD-ROM), a CD recordable (CD-R), and a CD rewritable (CD-RW), Blu-ray (registered trademark) disc, a magneto-optical disk (MO), a flexible disk (FD), magnetic tape, a hard disk, a ROM, an electrically erasable programmable read only memory (EEPROM) (registered trademark), a flash memory, a RAM, a secure digital (SD) memory card, etc.

The entirety or part of the above-described program may be recorded on such a recording medium and stored therein or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination of such networks. The program may be transmitted by using carrier waves.

The above-described program may be the entirety or part of another program, or may be recorded, together with another program, on a recording medium. The program may be divided and recorded on plural recording media. The program may be recorded in any form, for example, it may be compressed or encrypted, as long as it can be reconstructed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor, configured to:
compare items of capability information concerning a plurality of devices and extract a capability which is not sufficiently provided in a first device but is provided in a second device, the plurality of devices including the first and second devices;
create a menu to be used in the first device, the first device being able to display the extracted capability by using an icon in a mode different from an icon representing another capability and to display device information which indicates that the capability is available in the second device; and
send the menu to the first device.

2. The information processing apparatus according to claim 1, wherein, as the second device, the processor selects a device that is available for an operator to use the first device.

3. The information processing apparatus according to claim 2, wherein, if a plurality of the second devices are available for the operator of the first device, the processor creates the menu so that the plurality of the second devices are displayed in ascending order of a distance from the second devices to the first device or in descending order of the capability of the second devices.

4. The information processing apparatus according to claim 2, wherein, as the second device, the processor selects a device that is available in an organization in which the first device is installed and a device that is installed in a building in which the first device is installed and that is available for anyone.

5. The information processing apparatus according to claim 1, wherein the processor is further configured to:
obtain the capability information and the device information concerning each of the plurality of devices from the plurality of devices.

6. The information processing apparatus according to claim 5, wherein:
the processor obtains the capability information and the device information immediately before the creating a menu or receives the capability information and the device information voluntarily sent from the plurality of devices; and if the processor has received the capability information and the device information voluntarily sent from the plurality of devices, the processor creates a menu immediately after receiving the capability information and the device information.

7. The information processing apparatus according to claim 1, wherein the device information includes information concerning a location of the second device.

8. A non-transitory computer readable medium storing a program causing a computer to execute a process, the process comprising:

comparing items of capability information concerning a plurality of devices and extracting a capability which is not sufficiently provided in a first device but is provided in a second device, the plurality of devices including the first and second devices;

creating a menu to be used in the first device, the first device being able to display the extracted capability by using an icon in a mode different from an icon representing another capability and to display device information which indicates that the capability is available in the second device; and sending the menu to the first device.

9. An information processing apparatus comprising:

extracting means for comparing items of capability information concerning a plurality of devices and extracting a capability which is not sufficiently provided in a first device but is provided in a second device, the plurality of devices including the first and second devices;

creating means for creating a menu to be used in the first device, the first device being able to display the capability extracted by the extracting means by using an icon in a mode different from an icon representing another capability and to display device information which indicates that the capability is available in the second device; and sending means for sending the menu to the first device.

* * * * *